US008791168B2

(12) United States Patent
Babb et al.

(10) Patent No.: US 8,791,168 B2
(45) Date of Patent: Jul. 29, 2014

(54) VISCOELASTIC FOAMS HAVING HIGH AIR FLOW

(75) Inventors: David A. Babb, Lake Jackson, TX (US);
Bernard E. Obi, Pearland, TX (US);
Robert E. O'Neill, Clute, TX (US);
Alvaro Pauperio-Neto, Penha De Franca (BR)

(73) Assignees: Dow Global Technologies, Midland, MI (US); Dow Brasil Sudeste Industrial Ltda, Sao Paulo (BR)

( * ) Notice: Subject to any disclaimer, the term of this patent is extended or adjusted under 35 U.S.C. 154(b) by 567 days.

(21) Appl. No.: 12/441,666

(22) PCT Filed: Sep. 7, 2007

(86) PCT No.: PCT/US2007/019582
§ 371 (c)(1),
(2), (4) Date: Aug. 10, 2009

(87) PCT Pub. No.: WO2008/036173
PCT Pub. Date: Mar. 27, 2008

(65) Prior Publication Data
US 2009/0306237 A1   Dec. 10, 2009

Related U.S. Application Data

(60) Provisional application No. 60/846,257, filed on Sep. 21, 2006.

(51) Int. Cl.
*C08G 18/28* (2006.01)
(52) U.S. Cl.
USPC ........... 521/172; 521/110; 521/112; 521/130; 521/173; 521/174
(58) Field of Classification Search
USPC .................. 521/130, 172, 173, 174, 110, 112
See application file for complete search history.

(56) References Cited

U.S. PATENT DOCUMENTS

| | | | |
|---|---|---|---|
| 3,827,993 A * | 8/1974 | Cunningham et al. ........ 530/233 |
| 4,423,162 A | 12/1983 | Peerman et al. |
| 4,496,487 A | 1/1985 | Peerman et al. |
| 4,508,853 A | 4/1985 | Kluth et al. |
| 4,543,369 A | 9/1985 | Peerman et al. |
| 4,633,021 A | 12/1986 | Hanes |
| 4,731,486 A | 3/1988 | Abatjoglou et al. |
| 6,107,403 A | 8/2000 | Shepler |
| 6,433,121 B1 | 8/2002 | Petrovic et al. |
| 6,686,435 B1 | 2/2004 | Petrovic et al. |
| 6,747,068 B2 * | 6/2004 | Kelly .............................. 521/99 |
| 2004/0242910 A1 | 12/2004 | Dwan ' Isa et al. |
| 2005/0070620 A1 | 3/2005 | Herrington et al. |
| 2006/0041155 A1 | 2/2006 | Casper |
| 2006/0041156 A1 | 2/2006 | Casper et al. |
| 2006/0041157 A1 | 2/2006 | Petrovic et al. |
| 2007/0238800 A1 * | 10/2007 | Neal et al. ..................... 521/174 |

FOREIGN PATENT DOCUMENTS

| | | |
|---|---|---|
| EP | 106491 | 4/1984 |
| EP | 1981926 | 10/2008 |
| WO | WO-0014045 | 3/2000 |
| WO | WO-0104225 | 1/2001 |
| WO | WO-2004/096882 | 11/2004 |
| WO | WO-2004/096883 P | 11/2004 |

* cited by examiner

Primary Examiner — John Cooney

(57) ABSTRACT

A viscoelastic polyurethane foam is the reaction product of at least one natural oil derived polyol and at least one aromatic compound having an average of more than one isocyanate group. A viscoelastic polyurethane foam has an air flow of at least about 0.5 l/s, wherein the foam is formed in the substantial absence of copolymer polyol and has not (yet) been mechanically reticulated and is preferably prepared using at least one natural oil derived polyol, more preferably in an amount of at least about 20 weight percent of the polyols used. A process of preparing a viscoelastic foam, comprises steps of (A) forming a reaction mixture including at least one polyol, at least one polyisocyanate, water, at least one catalyst wherein a the polyol comprises at least one natural oil derived polyol; and (B) subjecting the reaction mixture to conditions sufficient to result in the reaction mixture to expand and cure to form a viscoelastic polyurethane foam. In another embodiment, a process comprises steps of (a) forming a natural oil derived polyol composition comprising at least one natural oil derived polyol and water; (b) admixing at least one gelling catalyst and at least one blowing catalyst with the natural oil derived polyol composition to form a catalyst polyol admixture; (c) supplying an isocyanate in an amount corresponding to an isocyanate index for a pMDI of at least about 65 and at most about 95 or, when the isocyanate is a TDI or MDI or combination thereof, at least about 80 and at most about 105; and (c) admixing the isocyanate with the catalyst polyol admixture.

12 Claims, 2 Drawing Sheets

US 8,791,168 B2

VISCOELASTIC FOAMS HAVING HIGH AIR FLOW

BACKGROUND

This invention involves polyurethane foams, preferably such foams having viscoelastic properties.

Foamed articles, especially polyurethane foamed articles are known for many years and used in many applications, especially for cushioning and mattresses. Resilient and viscoelastic or "memory foams" are among the foams known in the art. The viscoelastic foams can be produced by a number of different chemical approaches, all involving reactions of polyol and isocyanate compounds. The products are usually foamed using polyols having a functionality of an average of about 3 hydroxyl groups per molecule and a molecular weight range of about 400-1500. The foams are produced at low isocyanate index as compared to other polyurethane foams, below about 95, often 60-95, typically using water levels at most about 2.5 parts by weight per 100 parts by weight polyol (pphp), often in the range of 0.8-1.5 pphp, an usually with special silicone surfactants to control cell structure. The silicone surfactants assist in the cell opening process as well as control the overall structure of polyurethane cells. Formulation at a low isocyanate index also results in a foam with an improved level of softness and feel for bedding applications. Since the available isocyanate is limited or "under indexed," this promotes a competition for these molecules between the water and the polyol system thereby making the formulation technique very different from conventional urethanes. The low water level relative to common slab foams results in more polyol hydroxy groups available for reaction with isocyanate groups and less water for blowing, thus a more dense foam.

It would be desirable to use higher water levels while retaining viscoelastic properties because higher water levels result in lower density foam, and higher foam hardness (higher load bearing) at equivalent foam density. It would be desirable to use a higher isocyanate index without sacrificing viscoelastic properties because higher isocyanate levels help in reducing the residual toluenediamine (TDA) levels in the foam which result from the reaction of toluene diisocyanate (TDI) with two equivalents of water.

These viscoelastic polyurethane foams made from conventional polyols, specifically polyether polyols and isocyanates generally have undesirably low air flow properties, even at their best, less than about 1.0 standard cubic feet per minute (scfm) (0.47 l/s) under conditions of room temperature (22° C.) and atmospheric pressure (1 atm), therefore promote sweating when used as comfort foams (for instance, bedding, seating and other cushioning). Poor airflow also leads to poor heat and moisture conduction out of the foam resulting in (1) increased foam (bed) temperature and (2) moisture level. The consequence of higher temperature is higher resiliency and lowered viscoelastic character. Combined heat and moisture result in accelerated fatigue of the foam (bed). In addition, if foam air flows are sufficiently low, foams can suffer from shrinkage during manufacturing. Furthermore, improving the support factor of viscoelastic foams made from conventional polyether polyols is limited unless viscoelastic properties are compromised. These disadvantages are sometimes addressed by addition of copolymer polyols such as those containing styrene/acrylonitrile (SAN), for instance as taught in "Dow Polyurethanes Flexible Foams," 2$^{nd}$ edition, R. L. Herrington and K. Hock, ed. (1997). In addition to their complicated manufacture (resulting in high costs) the SAN copolymer polyols offer disadvantages of increasing the resiliency and decreasing the recovery time of the foam products, which degrade the desirable properties of viscoelastic foams.

It would be desirable to achieve a higher air flow value than is now achieved using a conventional polyether polyol while retaining viscoelastic properties of a foam, preferably an air flow greater than 1.0 scfm (0.47) l/s under conditions of 22° C. and 1 atm of pressure, preferably in the substantial absence of copolymer polyols especially those containing styrene/acrylonitrile polymers. Furthermore, it would be desirable to do so without sacrificing support factor, more preferably while improving support factor. Support factor is believed to be indicative of longer term durability of the foamed product.

SUMMARY OF THE INVENTION

It has now been found that a viscoelastic foam having an air flow greater than 1.0 scfm (0.47 l/s) under standard conditions can be prepared. For instance, the use of at least one natural oil derived polyol in the formation of a viscoelastic polyurethane foam results in the ability to accomplish at least one of the following without sacrificing viscoelastic properties as compared with a foam formed from the same formulation except substituting a conventional polyether polyol for the natural oil derived polyol and in the case of (a) and (b) making the indicated change in formulation: (a) use of a higher water level, (b) use of a higher isocyanate index (c) an increase in air flow; (d) an increase in support factor or (e) a combination thereof.

The invention includes a viscoelastic polyurethane foam which is the reaction product of at least one natural oil derived polyol and at least one aromatic compound having more than one isocyanate group.

In another aspect the invention is a viscoelastic polyurethane foam that has an air flow of at least about 0.5 l/s, wherein the foam is formed in the substantial absence of copolymer polyol and has not been mechanically reticulated and is preferably prepared using at least one natural oil derived polyol, more preferably in an amount of at least about 20 weight percent of the total polyols used.

In another aspect, the invention is a process of preparing a viscoelastic foam, comprising steps of (A) forming a reaction mixture including at least one polyol, at least one polyisocyanate, water, at least one catalyst wherein the polyol comprises at least one natural oil derived polyol; and (B) subjecting the reaction mixture to conditions sufficient to result in the reaction mixture to expand and cure to form a viscoelastic polyurethane foam.

In yet another aspect, the invention is a process comprising steps of (a) forming a natural oil derived polyol composition comprising at least one natural oil derived polyol and water; (b) admixing at least one gelling catalyst and at least one blowing catalyst with the natural oil derived polyol composition to form a catalyst polyol admixture; (c) supplying an isocyanate in an amount corresponding to an isocyanate index for a pMDI of at least about 65 and at most about 95 or, when the isocyanate is a TDI or MDI or combination thereof, at least about 80 and at most about 105 and (c) admixing the isocyanate with the catalyst polyol admixture.

DETAILED DESCRIPTION OF THE INVENTION

Definitions

Figure 1:
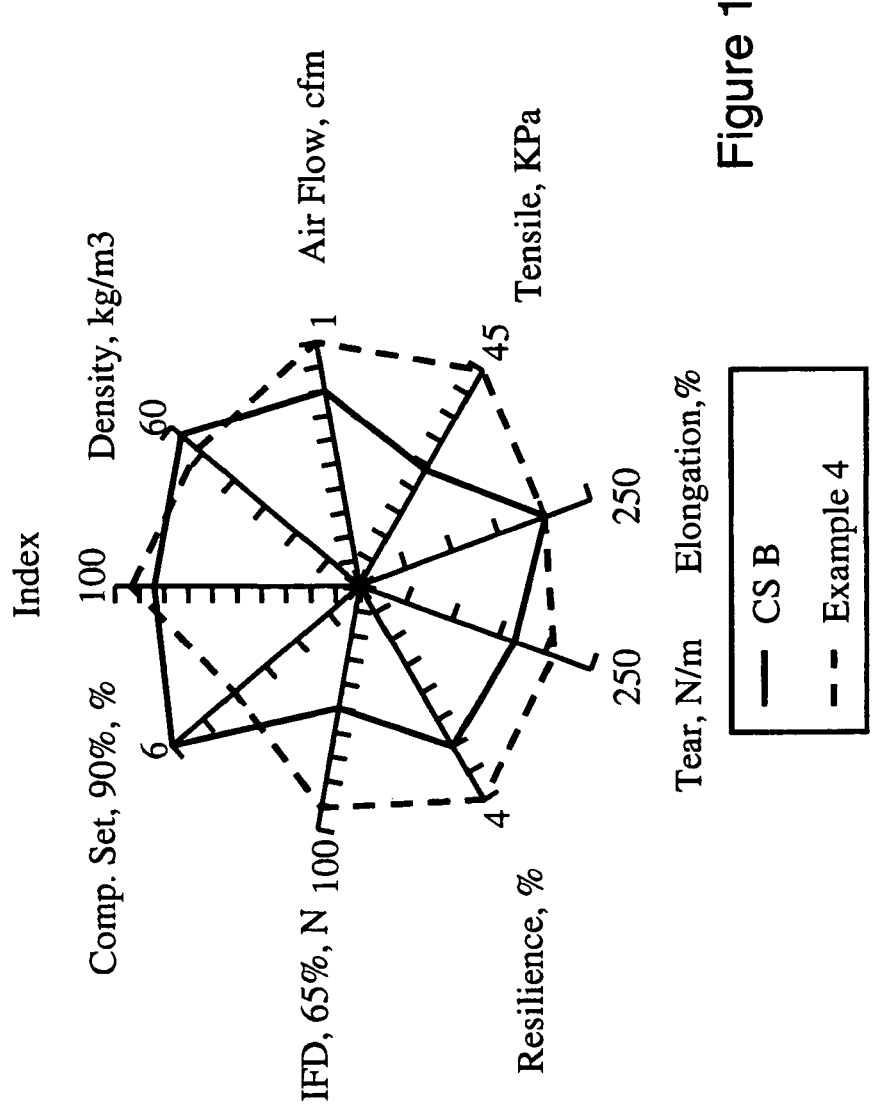
FIG. 1 is a circular graph of properties of a foam of the invention and a comparative foam made not using a natural oil derived polyol composition.

As used herein, the term "viscoelasticity" is the time dependent response of a material to an applied constant load (stress) due to the co-existence of elastic (solid) and viscous (liquid) characteristics in the material. This is best observed in creep experiments (akin to the process of a person lying on the bed at night—constant load) in which the rates of deformation varies with time, starting out with an initial instantaneous deformation value (elastic component) and then going through several fast deformation regimes with time (viscoelastic components) and finally reaching a steady strain rate value (liquid component) or zero strain rate value (highly cross linked network materials). In dynamic mechanical characterization, the level of viscoelasticity is proportional to the damping coefficient measured by the tan delta of the material. The tan delta is the ratio of the viscous dissipative loss modulus G" to the elastic storage modulus G'. High tan delta values imply that there is a high viscous component in the material behavior and hence a strong damping to any perturbation will be observed.

The term "viscoelastic foam" is intended to designate those foams having a resilience of at most 25%, as measured according to ASTM D3574 Test H. Resilient foams are those having a resilience of at least 25%, and high resilience foams have a resilience above 50%. Viscoelastic (VE) foams exhibit a time-delayed and rate-dependent response to an applied stress. In addition to low resiliency they have slow recovery when compressed. In a polyurethane foam, these properties are often associated with the glass transition temperature ($T_g$) of the polyurethane. Viscoelasticity is often manifested when the polymer has a Tg at or near the use temperature, which is room temperature for many applications. Viscoelastic or "memory" foams have a number of very desirable performance characteristics. Viscoelastic foam tends to be low resilience, shape or body conforming, and able to dampen both sound and vibration or shock.

The term "resilience" is used to refer to the quality of a foam perceived as springiness. It is measured according to the procedures of ASTM D3574 Test H. This ball rebound test measures the height a dropped steel ball of known weight rebounds from the surface of the foam when dropped under specified conditions and expresses the result as a percentage of the original drop height. As measured according to the ASTM test, a cured VE foam exhibits a resiliency of advantageously at most about 20%, preferably at most about 10%, more preferably at most about 5%, most preferably at most about 3%.

The term "ball rebound" is used herein to refer to result of test procedure of ASTM D3574-Test H as previously described.

"Glass transition temperature" (Tg) is the temperature point corresponding to the peak value of the tan delta curve in a dynamic mechanical thermal analysis (DMTA) measurement. Typically a piece of foam sample 25 millimeter in diameter by 25 millimeter high is subjected to an oscillatory shear deformation at a frequency of 1 Hertz and an initial strain rate of 1%. Data is collected over the temperature range of −150° C. to +150° C. at 5° C. intervals. Temperatures are allowed to equilibrate for two minutes before each reading was taken. The storage modulus G', loss modulus G", and the ratio of loss modulus to storage modulus G"/G' known as the loss tangent or tan delta are measured versus temperature. The temperature corresponding to the peak of the tan delta curve is taken as the glass transition temperature (Tg) of the specimen tested.

As used herein, the term "support factor" refers to the ratio of 65% Indentation Force Deflection divided by 25% Indentation Force Deflection. The term "Indentation Force Deflection" (IFD) refers to a measure of the load bearing capacity of a flexible material (for instance, foam) measured as the force (in pounds) (converted to kPa) required to compress a four inch (10 cm) thick sample no smaller than 24 inches square (155 cm$^2$), to 25 or 65 percent of the sample's initial height as indicated by the terms 25% IFD and 65% IFD, respectively. Flexible foam IFD measurements can range from about 5 pounds (22 N) (plush) to about 80 pounds (356 N) (very firm). The IFD is measured according to the procedures of ASTM 3574-01, Test B.

The term "density" is used herein to refer to weight per unit volume of a foam. In the case of viscoelastic polyurethane foams the density is determined according to the procedures of ASTM D357401, Test A. Advantageously, the viscoelastic foam has a density of advantageously at least about 3, preferably at least about 3.5 more preferably at least about 4 and preferably at most about 8, more preferably at most about 6, most preferably at most about 5.5 pounds/ft$^3$ (48, 56, 64, 128, 96, 88 kg/m$^3$, respectively).

The term "tensile strength" as applied to a foam is used herein to refer to the maximum force which a dogbone shaped foam sample can bear while being extended under linear (uniaxial) extensional force. The stress is increased until the material reaches a break point at which time the load and extension at break are used to calculate the tensile strength and the elongation, all determined according to the procedures of ASTM D-3574, Test E and is measured in pounds per square inch (PSI) or kiloPascals (kPa).

The term "ultimate elongation" as applied to a foam is used herein to refer to the linear extension which a sample of foam can attain before rupture. The foam is tested by the same method used to determine tensile strength, and the result is expressed as a percentage of the original length of the foam sample according to the procedures of ASTM D-3574, Test E.

The term "tear strength" is used herein to refer to the maximum average force required to tear a foam sample which is pre-notched with a slit cut lengthwise into the foam sample. The test results are determined according to the procedures of ASTM D3574-F in pounds per linear inch (PLI) or in Newtons per meter (N/m).

The term "load at 25% deflection" is used herein to refer to the force required to displace a foam sample of dimensions 4 in×4 in×2 in thickness (10.16×10.16×5.08 cm) to 75% of its original thickness determined according to the procedures of ASTM D 3574 B and is measured in pounds force (IbF) or in Newtons (N). Similarly loads at 65% and 75% deflections refer to the forces required to compress a foam of dimension (4 in×4 in×2 in thickness) (10.16×10.16×5.08 cm) to 35% or 25% of its original foam height, respectively.

The term "recovery time" is used herein to refer to the time it takes a foam to recover after compression, an applied force of 1 pound of force (4.45 N), which is determined according to the procedures of ASTM D-3574M and is measured in seconds. For a viscoelastic foam this time is desirably at least about 3 seconds, preferably at least about 5 seconds, more preferably at least about 7 seconds, and most preferably at least about 10 seconds, but advantageously less than about 30 seconds and preferably less than about 20 seconds.

The term "CS 75% Parallel-CT" stands for compression set test measured at the 75% compressive deformation level and parallel to the rise direction in the foam. This test is used herein to correlate in-service loss of cushion thickness and changes in foam hardness. The compression set is determined according to the procedures of ASTM D 3574-95, Test I. and is measured as percentage of original thickness of the sample. Similarly, "CS 90% Parallel-CT" refers to the same measurement as above (compression set), but this time measured at 90% compressive deformation level of the sample, parallel to the rise direction in the foam.

The term "air flow" refers to the volume of air which passes through a 1.0 inch (2.54 cm) thick 2 inch×2 inch (5.08 cm) square section of foam at 125 Pa (0.018 psi) of pressure. Units are expressed in cubic decimeters per second and converted to standard cubic feet per minute. A representative commercial unit for measuring air flow is manufactured by TexTest AG of Zurich, Switzerland and identified as TexTest Fx3300. This measurement follows ASTM D 3574 Test G.

The term "hardness" refers to that property measured by the procedures of ASTM D 3574, Test B which corresponds to IFD. Specifically 65% IFD is used herein as a measure of hardness.

The term "modulus of elasticity" or "elasticity modulus" is a measure of material stiffness. It is the proportionality factor that relates the change in unit length of a material in response to a unit stress within the linear elastic limits, and is a characteristic of the material. The modulus of elasticity is obtained by dividing the applied force by the cross sectional area of the material normal to the applied force, to obtain the applied stress; this stress is then divided by the resulting strain to obtain modulus. Modulus of elasticity is measured according to the procedures of ASTM D-638.

The term "NCO Index" means isocyanate index, as that term is commonly used in the polyurethane art. As used herein as the equivalents of isocyanate, divided by the total equivalents of isocyanate-reactive hydrogen containing materials, multiplied by 100. Considered in another way, it is the ratio of isocyanate-groups over isocyanate-reactive hydrogen atoms present in a formulation, given as a percentage. Thus, the isocyanate index expresses the percentage of isocyanate actually used in a formulation with respect to the amount of isocyanate theoretically required for reacting with the amount of isocyanate-reactive hydrogen used in a formulation.

As used herein, "polyol" refers to an organic molecule having an average of greater than 1.0 hydroxyl groups per molecule. It may also include other functionalities, that is, other types of functional groups.

As used herein the term "conventional polyether polyol" is a polyol formed from at least one alkylene oxide, preferably ethylene oxide, propylene oxide or a combination thereof, and not having a part of the molecule derived from a vegetable or animal oil, a polyol of the type commonly used in making polyurethane foams, particularly for the practice of this invention, viscoelastic polyurethane foams. A polyether polyol can be prepared by known methods such as by alkoxylation of suitable starter molecules. Such a method generally involves reacting an initiator such as, water, ethylene glycol, or propylene glycol, with an alkylene oxide in the presence of a catalyst. Ethylene oxide, propylene oxide, butylene oxide, or a combination of these oxides can be particularly useful for the alkoxylation reaction. A polyether polyol, for instance polyoxyethylene polyol can contain alkyl substituents. The process for producing polyether polyols can involve a heterogeneous feed of a mixture of alkylene oxides, a sequential feed of pure or nearly pure alkylene oxide polyols to produce a polyol with blocks of single components, or a polyol which is capped with, for example, ethylene oxide or propylene oxide. These types of polyols are all known and used in polyurethane chemistry.

The term "natural oil polyol" (hereinafter NOP) is used herein to refer to compounds having hydroxyl groups which compounds are isolated from, derived from or manufactured from natural oils, including animal and vegetable oils, preferably vegetable oils. Examples of vegetable and animal oils that may be used include, but are not limited to, soybean oil, safflower oil, linseed oil, corn oil, sunflower oil, olive oil, canola oil, sesame oil, cottonseed oil, palm oil, rapeseed oil, tung oil, fish oil, or a blend of any of these oils. Alternatively, any partially hydrogenated or epoxidized natural oil or genetically modified natural oil can be used to obtain the desired hydroxyl content. Examples of such oils include, but are not limited to, high oleic safflower oil, high oleic soybean oil, high oleic peanut oil, high oleic sunflower oil (such as NuSun sunflower oil), high oleic canola oil, and high erucic rapeseed oil (such as Crumbe oil). Natural oil polyols are well within the knowledge of those skilled in the art, for instance as disclosed in Colvin et al., UTECH Asia, *Low Cost Polyols from Natural Oils*, Paper 36, 1995 and "Renewable raw materials—an important basis for urethane chemistry:" *Urethane Technology*: vol. 14, No. 2, April/May 1997, Crain Communications 1997, WO 01/04225, WO 040/96882; WO 040/96883; U.S. Pat. No. 6,686,435, U.S. Pat. No. 6,433,121, U.S. Pat. No. 4,508,853, U.S. Pat. No. 6,107,403, US Pregrant publications 20060041157, and 20040242910.

The term "natural oil derived polyol" is used herein to refer to NOP compounds which are derived from natural oils. For instance, natural oils or isolates therefrom are reacted with compounds ranging from air or oxygen to organic compounds including amines and alcohols. Frequently, unsaturation in the natural oil is converted to hydroxyl groups or to a group which can subsequently be reacted with a compound that has hydroxyl groups such that a polyol is obtained. Such reactions are discussed in the references in the preceding paragraph.

The term "hydroxyl number" indicates the concentration of hydroxyl moieties in a composition of polymers, particularly polyols. A hydroxyl number represents mg KOH/g of polyol. A hydroxyl number is determined by acetylation with pyridine and acetic anhydride in which the result is obtained as the difference between two titrations with KOH solution. A hydroxyl number may thus be defined as the weight of KOH in milligrams that will neutralize the acetic anhydride capable of combining by acetylation with 1 gram of a polyol. A higher hydroxyl number indicates a higher concentration of hydroxyl moieties within a composition. A description of how to determine the hydroxyl number for a composition can be found in texts well-known in the art, for example in Woods, G., *The ICI Polyurethanes Book*—2nd ed. (ICI Polyurethanes, Netherlands, 1990).

The term "primary hydroxyl group" means a hydroxyl group (—OH) on a carbon atom which has only one other carbon atom attached to it, (preferably which has only hydrogen atoms attached thereto) (—CH$_2$—OH).

The term "cure" or "cured" as applied to a viscoelastic foam refers to the condition in which all isocyanate functional groups have been converted to other chemical species via chemical reactions.

The term "functionality" particularly "polyol functionality" is used herein to refer to the number of hydroxyl groups in a polyol.

All percentages, preferred amounts or measurements, ranges and endpoints thereof herein are inclusive, that is, "less than about 10" includes about 10. "At least" is, thus, equivalent to "greater than or equal to," and "at most" is, thus, equivalent "to less than or equal to." Numbers herein have no more precision than stated. Thus, "105" includes at least from 104.5 to 105.49. Furthermore, all lists are inclusive of combinations of two or more members of the list. All ranges from a parameter described as "at least," "greater than," "greater than or equal to" or similarly, to a parameter described as "at most," "up to," "less than," "less than or equal to" or similarly are preferred ranges regardless of the relative degree of preference indicated for each parameter. Thus a range that has an advantageous lower limit combined with a most preferred upper limit is preferred for the practice of this invention. All amounts, ratios, proportions and other measurements are by weight unless stated otherwise. All percentages refer to weight percent based on total composition according to the practice of the invention unless stated otherwise. Unless stated otherwise or recognized by those skilled in the art as otherwise impossible, steps of processes described herein are optionally carried out in sequences different from the sequence in which the steps are discussed herein. Furthermore, steps optionally occur separately, simultaneously or with overlap in timing. For instance, such steps as heating and admixing are often separate, simultaneous, or partially overlapping in time in the art. Unless stated otherwise, when an element, material, or step capable of causing undesirable effects is present in amounts or in a form such that it does not cause the effect to an unacceptable degree it is considered substantially absent for the practice of this invention. Furthermore, the terms "unacceptable" and "unacceptably" are used to refer to deviation from that which can be commercially useful, otherwise useful in a given situation, or outside predetermined limits, which limits vary with specific situations and applications and may be set by predetermination, such as performance specifications. Those skilled in the art recognize that acceptable limits vary with equipment, conditions, applications, and other variables but can be determined without undue experimentation in each situation where they are applicable. In some instances, variation or deviation in one parameter may be acceptable to achieve another desirable end.

The term "comprising", is synonymous with "including," "containing," or "characterized by," is inclusive or open-ended and does not exclude additional, unrecited elements, material, or steps. The term "consisting essentially of" indicates that in addition to specified elements, materials, or steps; elements, unrecited materials or steps may be present in amounts that do not unacceptably materially affect at least one basic and novel characteristic of the subject matter. The term "consisting of" indicates that only stated elements, materials or steps are present.

This invention comprises viscoelastic foam made from at least one natural oil derived polyol and at least one isocyanate. The natural oil derived polyol is suitably any such compound that those skilled in the art can use according to the practice of the invention to produce a viscoelastic foam, preferably a viscoelastic foam having air flow greater than that of a foam produced using the same formulation except where the natural oil derived polyol is replaced by a polyether polyol having the same equivalent weight, same average functionality and same ratio of primary hydroxyl groups to total hydroxyl groups. While it is preferred that a comparison be made with a polyether polyol having the same values for these three characteristics, it is believed that the air flow comparison is meaningful when there are variations of preferably at most about 50%, more preferably at most about 25%, most preferably at most about 10% in each characteristic, preferably at most 2 of the characteristics, more preferably at most 1 of the characteristics. The natural oil derived polyol advantageously has at least about 2.0, preferably at least about 2.4, more preferably at least about 2.7, most preferably at least about 3.0, and preferably at most about 12, more preferably at most about 8, most preferably at most about 6 hydroxyl groups per molecule. The natural oil derived polyol advantageously has an equivalent weight at least sufficient to form foam that is viscoelastic, that is advantageously at least about 200, preferably at least about 300, more preferably at least about 500, and preferably at most about 2000, more preferably at most about 1500, most preferably at most about 1000. The natural oil derived polyols having these preferred hydroxyl functionalities, equivalent weights or a combination thereof are suitably used alone or blended with conventional polyether polyols in the practice of the invention. Preferably polyols with equivalent weights greater than about 200 and less than about 700 are used in blends with polyols of equivalent weight greater than about 1000 and less than about 2500. Polyols disclosed in WO 04/096882 and WO 04/096883 are most preferred. These are the reaction products of initiators having active hydrogen such as a polyol or polyamine, amino alcohol or mixture thereof with a vegetable oil based monomer prepared by such processes as hydroformylation of unsaturated fatty acids or esters, followed by hydrogenation of at least a portion of the resulting formyl groups. Such a polyol is referred to hereinafter as "initiated fatty acid polyester alcohol." Among these, more preferred polyols include those initiated with alkoxylated, preferably ethoxylated, polyhydroxyl compounds, preferably glycerin, sucrose, or combinations thereof, and having a molecular weight of advantageously at least about 400, more preferably at least about 600 and preferably at most about 1000, more preferably at most about 800. Other more preferred polyols for practice of the invention include those disclosed in such references as Grosch, G. H. et. al., WO0014045(A1) (Mar. 16, 2000); David M. Casper, US20060041155(A1), Aug. 23, 2004; David M. Casper and Trevor Newbold, US20060041156 (A1); Ashvin Shah and Tilak Shah, WO 0104225(A1), (Jul. 12, 2000); Ron Herrington and Jeffrey Malsam, US20050070620(A1), (Jun. 25, 2004); Dwight E. Peerman and Edgar R. Rogier, EP106491 (Sep. 6, 1983); U.S. Pat. No. 4,496,487 (Sep. 7, 1982); U.S. Pat. No. 4,423,162 (Dec. 27, 1983); and U.S. Pat. No. 4,543,369 (Oct. 26, 1984); Zoran S. Petrovic et al.; US20060041157(A1), (Jun. 24, 2005); which teach reaction products of epoxidized soybean oil with alcohols such as methanol, ethanol, and the like, or the reaction products of alkylene oxides such as ethylene oxide, propylene oxide, and the like with castor oil. Such a polyol is referred to hereinafter as a "castor and soy epoxide product." Alkylene oxide adds preferentially to an ethoxide group from EO addition to a secondary hydroxyl of a fatty acid rather than to another secondary hydroxyl. Such polyols have long chains of EO and higher equivalent weight than is considered optimal for making viscoelastic foam as well as having remaining secondary alcohol groups. Double metal cyanate catalysts and other catalysts within the skill in the art are used to improve the ratio of addition to the secondary alcohol groups. Such a polyol is referred to hereinafter as "secondary alcohol alkoxylation product." Optionally any of the natural oil derived polyols is alkoxylated with an epoxide, preferably an alkylene oxide, more preferably ethylene oxide or propylene oxide to increase the molecular weight.

In making a initiated fatty acid polyester alcohol preferred in the practice of the invention, a hydroxymethyl-containing polyester polyol is conveniently prepared by reacting a hydroxymethyl-group containing fatty acid having from 12-26 carbon atoms, or an ester of such a hydroxymethylated fatty acid, with a polyol, hydroxylamine or polyamine initiator compound having an average of at least 20 hydroxyl, primary amine and/or secondary amine groups/molecule. Proportions of starting materials and reaction conditions are selected such that the resulting hydroxymethyl-containing polyester polyol contains an average of at least 1.3 repeating units derived from the hydroxymethyl-group containing fatty acid or ester thereof for each hydroxyl, primary amine and secondary amine groups in the initiator compound, and the hydroxymethyl-containing polyester polyol has an equivalent weight of at least 400 up to about 15,000. The hydroxymethyl-containing polyester polyol advantageously is a mixture of compounds having the following average structure (Structure 1):

wherein R is the residue of an initiator compound having n hydroxyl and/or primary or secondary amine groups, where n is at least two; each X is independently —O—, —NH— or —NR'— in which R' is an inertly substituted alkyl, aryl, cycloalkyl, or aralkyl group, p is a number from 1 to n representing the average number of [X—Z] groups per hydroxymethyl-containing polyester polyol molecule, Z is a linear or branched chain comprising residues of fatty acids. "Inertly substituted" groups are groups that do not react with an isocyanate groups and which do not otherwise engage in side reactions during the preparation of the hydroxymethyl-group containing polyester polyol. Examples of such inert substituents include as aryl, cycloalkyl, silyl, halogen (especially fluorine, chlorine or bromine), nitro, ether, ester, and the like.

In formula I, n is preferably from 2-8, more preferably from 2-6, even more preferably from 2-5 and especially from about 3-5. Each X is preferably —O—. The total average number of fatty acid residues per hydroxymethylated polyol molecule is preferably at least 1.5 times the value of n, such from about 1.5 to about 10 times the value of n, about 2 to about 10 times the value of n or from about 2 to about 5 times the value of n.

Hydroxymethyl-containing polyester polyols according to structure I can be prepared in a multi-step process from vegetable or animal fats that contain one or more carbon-carbon double bonds in at least one constituent fatty acid chain. Suitable fats include, for example, chicken fat, canola oil, citrus seed oil, cocoa butter, corn oil, cottonseed oil, lard, linseed oil, oat oil, olive oil, palm oil, peanut oil, rapeseed oil, rice bran oil, safflower oil, sesame oil, soybean oil, sunflower oil, or beef tallow.

The vegetable or animal fat is conveniently first subjected to a transesterification reaction with a lower alkanol, especially methanol or ethanol, to produce alkyl esters of the constituent fatty acids. The resulting alkyl esters may be hydrolyzed to the corresponding fatty acids if desired, but this step is usually not necessary or desirable. The alkyl esters (or fatty acids) are conveniently hydroformylated by reaction with carbon monoxide and hydrogen. This introduces —CHO groups onto the fatty acid chain at the site of carbon-carbon unsaturation. Suitable hydroformylation methods are described in U.S. Pat. Nos. 4,731,486 and 4,633,021, for example, and in U.S. Provisional Patent Application 60/465,663, filed Apr. 25, 2003, all incorporated herein by reference. Some fatty acid groups contain multiple carbon-carbon double bond sites. In such cases, the hydroformylation reaction may not introduce —CHO groups at all of the double bond sites. A subsequent hydrogenation step converts the —CHO groups to hydroxymethyl (—CH$_2$OH) groups while hydrogenating residual carbon-carbon bonds to, remove essentially all carbon-carbon unsaturation. The resulting mixture of hydromethylated fatty acids is then reacted with an initiator compound, with removal of water or lower alkanol to form the polyester polyol.

The initiator contains two or more hydroxyl, primary amine or secondary amine groups, and can be a polyol, an alkanol amine or a polyamine. Initiators of particular interest are polyols. Polyether polyol initiators are useful, including polymers of ethylene oxide and/or propylene oxide having from 2-8, especially 2-4 hydroxyl groups/molecule and a molecular weight of about 150-3000, especially from 200-1000.

Hydroxymethyl-containing fatty acids made in the foregoing process tend to be a mixture of materials having no hydroxymethyl groups, and materials having 1, 2 or 3 hydroxymethyl groups. The proportion of materials having 2 and 3 hydroxymethyl groups is typically somewhat lower than the proportion of starting fatty acids (or alkyl esters) containing 2 and 3 carbon-carbon double bonds, as the hydroformylation reaction often does not take place across all the carbon-carbon double bonds unless stringent reaction conditions are used. Carbon-carbon double bonds that are not hydroformylated generally become hydrogenated.

Methods of making such hydroxymethyl-containing polyester polyols are described in WO2004/096882.

The hydroxymethyl-containing polyester polyol so produced generally contains some unreacted initiator compound, and may contain unreacted hydromethylated fatty acids (or esters). Initiator compounds often react only monofunctionally or difunctionally with the fatty acids (or esters), and resulting polyester polyol often contains free hydroxyl or amino groups bonded directly to the residue of the initiator compound.

The natural oil derived polyol is optionally used with polyols different from natural oil derived polyol, such as polyether polyols commonly used in forming polyurethane foams, especially viscoelastic foams, referred to hereinafter as conventional polyol or additional polyol. To make a viscoelastic foam, the conventional polyol advantageously has a functionality of from about 2.5 to about 6 hydroxyl groups per molecule and an equivalent weight from about 200 to about 1000. These polyol(s) preferably have molecular weights of at least about 600, preferably at least about 650 to at most about 4500, more preferably at most about 3000. Polyol molecular weights herein are all number average molecular weights. The polyol may be a polymer of one or more alkylene oxides such as ethylene oxide, propylene oxide and 1,2-butylene oxide, or mixtures of such alkylene oxides. Preferred polyethers are polypropylene oxides or polymers of a mixture of propylene oxide and ethylene oxide. The additional polyol may also be a polyester polyol. These polyester polyols include reaction products of polyols, preferably diols, with polycarboxylic acids or their anhydrides, preferably dicarboxylic acids or dicarboxylic acid anhydrides. The polycarboxylic acids or anhydrides may be aliphatic, cycloaliphatic, aromatic and/or heterocyclic and may be substituted, such as with halogen atoms. The polycarboxylic acids may be unsaturated. Examples of these polycarboxylic acids include succinic acid, adipic acid, terephthalic acid, isophthalic acid, trimellitic anhydride, phthalic anhydride, maleic acid, maleic acid anhydride and fumaric acid. The polyols used in making the polyester polyols preferably have an equivalent weight of 150 or less and include ethylene glycol, 1,2- and 1,3-propylene glycol, 1,4- and 2,3-butane diol, 1,6-hexane diol, 1,8-octane diol, neopentyl glycol, cyclohexane dimethanol, 2-methyl-1,3-propane diol, glycerine, trimethylol propane, 1,2,6-hexane triol, 1,2,4-butane triol, trimethylolethane, pentaerythritol, quinitol, mannitol, sorbitol, methyl glycoside, diethylene glycol, triethylene glycol, tetraethylene glycol, dipropylene glycol, dibutylene glycol and the like. Polycaprolactone polyols such as those sold by The Dow Chemical Company under the trade name "Tone" are also useful. While any conventional polyol is suitably used, preferred polyols are those which are aliphatic polyols, more preferably polyester polyols, most preferably polyether polyols.

There are a number of approaches to making viscoelastic foams. The natural oil derived polyols are suitably used in any of the methods within the skill in the art. In one common embodiment, at least one higher molecular weight (MW) polyol having an average of about 3 functional to about 6 hydroxyl groups and a molecular weight from about 3000 to about 4500 is used with at least one lower molecular weight polyol having about 2 to about 3 hydroxyl groups per molecule and a molecular weight from about 450 to about 800. In another embodiment, at least one medium molecular weight polyol having about 3 hydroxyl groups per molecule and a molecular weight of about 1000 is used. The natural oil derived polyol is suitably used as a higher, lower, or medium molecular weight polyol alone or in admixture with another natural oil derived polyol or a conventional polyol as previously described. Each natural oil derived polyol optionally has all-primary or all secondary or combinations of primary and secondary hydroxyl groups. When the natural oil derived polyol is combined with at least one conventional polyol, it suitably has all primary or secondary or combinations of primary and secondary hydroxyl groups. Preferably, in the practice of the invention, in a blend of polyols, at least one polyol, which may be the natural oil derived polyol or conventional polyol, has primary hydroxyl groups, more preferably at least 20%, preferably at least 50%, most preferably all of, the hydroxyl groups of at least one polyol are primary hydroxyl groups.

For the purposes of this invention the polyol or polyol combination used to make a viscoelastic foam of the invention is referred to as natural oil derived polyol composition. The natural oil derived polyol in a natural oil derived polyol composition is advantageously at least about 1, more advantageously at least about 10, preferably at least about 20, more preferably at least about 30, most preferably at least about 50 and at most about 100, more advantageously at most about 90, preferably at most about 80, more preferably at most about 75, most preferably at most about 70 weight percent based on total weight of polyols present (corresponding also to pphp total polyol) at least one natural oil derived polyol or a combination of natural oil derived polyols.

The natural oil derived polyol composition is reacted with at least one isocyanate having an average of 1.8 or more isocyanate groups per molecule. The isocyanate functionality is preferably at least about 1.9 and preferably at most about 4, at most about 3.5, most preferably at most about 2.5. Aromatic polyisocyanates are generally preferred based on properties imparted to the product polyurethane. Exemplary polyisocyanates include, for example, m-phenylene diisocyanate, 2,4- and/or 2,6-toluene diisocyanate (TDI), the various isomers of diphenylmethanediisocyanate (MDI), and polyisocyanates having more than 2 isocyanate groups, preferably MDI and derivatives of MDI such as bluret-modified "liquid" MDI products and polymeric MDI, (PMDI) as well as mixtures of the 2,4- and 2,6-isomers of TDI, with the latter most preferred in the practice of the invention. A 65/35 weight percent mixture of the 2,4 isomer to the 2,6 TDI isomer is typically used for viscoelastic foams, but the 80/20 weight percent mixture of the 2,4 isomer to the 2,6 TDI isomer is also useful in the practice of this invention and is preferred based on availability. Other preferred isocyanates include methylene diphenyl diisocyanate (MDI) and or its polymeric form (PMDI) for producing the foams of the invention.

Water is used in addition to the natural oil derived polyol composition and isocyanate in a composition used to make a foam of the invention. The water is used to achieve blowing of the foam and to form urea segments (hard segments) by reaction with the isocyanate. While slab stock polyurethane foams typically use an amount of water from about 2.5 to about 6 parts by weight per hundred parts by weight of total polyol (pphp), viscoelastic foams of the invention advantageously use at least about 0.5, preferably at least about 0.6, more preferably at least about 0.8, most preferably at least about 1.0 percent of water by weight, calculated as a percentage of the total weight of polyol components, (pphp) and advantageously at most about 2.5, preferably at most about 2.0, more preferably at most about 1.8, most preferably at most about 1.5 pphp based on total weight of polyol components. In some instances the blowing reactions or density control is achieved by combining water with other blowing agents, for examples hydrocarbons (for instance. cyclo, iso, or n-pentanes) or hydrofluorocarbons (HFCs) and other volatilizable molecules (gaseous or liquids).

The amount of isocyanate in proportion to the total polyol and water is indicated by the isocyanate index. In the viscoelastic foams of the invention, when TDI or MDI is used the isocyanate index is preferably at least about 80, more preferably at least about 85, most preferably at least about 90, and at most about 110, more preferably at most about 105, most preferably at most about 100. When pMDI is used, the isocyanate index is advantageously at least about 65, preferably at least about 70, more preferably at least about 80, most preferably at least about 85, preferably at most about 100, more preferably at most about 95, most preferably at most about 90. For blends of isocyanates, the combined isocyanate index is advantageously at least about 70, more advantageously at least about 75, preferably at least about 80, more preferably at least about 85, most preferably at least about 90 and advantageously at most about 110, more advantageously at most about 105, preferably at most about 100, more preferably at most about 95, most preferably at most about 90.

At least one natural oil derived polyol composition and at least one isocyanate are reacted together in the presence of one or more catalysts. The formation of urethane foams commonly utilizes at least one catalyst that may catalyze the polyol-isocyanate (gelling) reaction or at least one that may catalyze the water-isocyanate (blowing) reaction (when water is used as the blowing agent), or both. In making water-blown foams, it is typical to use a mixture of at least one catalyst that favors the blowing reaction and at least one other that favors the gelling reaction or one catalyst that does both. These are balanced to achieve sufficient gelling (viscosity) to maintain a desirable cellular structure while achieving sufficient blowing to foam the formulation and, preferably, open many of the cells in the foam. In making a viscoelastic foam, a tin catalyst such as dibutyltin dilaurate, (DBTDL) is typically used. Surprisingly, in the practice of the present invention, while DBTDL is useful, stannous octoate (SO) is also a preferred tin catalyst, in some embodiments more preferred. It is also common to produce viscoelastic foams using a combination of amine polyols, which combination is useful in the practice of this invention; however, in the practice of this invention use of a single amine catalyst that promotes the blowing reaction is preferred to reduce odor of the final foam product and to simplify the formulations to make the foam products.

A wide variety of materials are known to catalyze polyurethane forming reactions, including tertiary amines; tertiary phosphines such as trialkylphosphines and dialkylbenzylphosphines; various metal chelates such as those which can be obtained from acetylacetone, benzoylacetone, trifluoroacetyl acetone, ethyl acetoacetate and the like, with metals such as Be, Mg, Zn, Cd, Pd, Ti, Zr, Sn, As, Bi, Cr, Mo, Mn, Fe, Co and Ni; acid metal salts of strong acids, such as ferric chloride, stannic chloride, stannous chloride, antimony trichloride, bismuth nitrate and bismuth chloride; strong bases such as alkali and alkaline earth metal hydroxides, alkoxides and phenoxides, various metal alcoholates and phenolates such as $Ti(OR)_4$, $Sn(OR)_4$ and $Al(OR)_3$, wherein R is alkyl or aryl, and the reaction products of the alcoholates with carboxylic acids, beta-diketones and 2-(N,N-dialkylamino) alcohols; alkaline earth metal, Bi, Pb, Sn or Al carboxylate salts; and tetravalent tin compounds, and tri- or pentavalent bismuth, antimony or arsenic compounds. Preferred catalysts include tertiary amine catalysts and organotin catalysts. Examples of commercially available tertiary amine catalysts include: trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl)ether, triethylenediamine and dimethylalkylamines where the alkyl group contains from 4 to 18 carbon atoms. Mixtures of these tertiary amine catalysts are often used. Examples of commercially available amine catalysts include Niax™ A1 and Niax™ A99 (bis (dimethylaminoethyl)ether in propylene glycol available from GE Advanced Materials, Silicones), Niax™ B9 (N,N-dimethylpiperazine and N—N-dimethylhexadecylamine in a polyalkylene oxide polyol, available from GE Advanced Materials, Silicones), Dabco™ 8264 (a mixture of bis(dimethylaminoethyl)ether, triethylenediamine and dimethylhydroxyethyl amine in dipropylene glycol, available from Air Products and Chemicals), and Dabco™ 33LV (triethylene diamine in dipropylene glycol, available from Air Products and Chemicals), Niax™ A-400 (a proprietary tertiary amine/ carboxylic salt and bis(2-dimethylaminoethy)ether in water and a proprietary hydroxyl compound, available from GE Advanced Materials, Silicones); Niax™ A-300 (a proprietary tertiary amine/carboxylic salt and triethylenediamine in water, available from GE Advanced Materials, Silicones); Polycat™ 58 (a proprietary amine catalyst available from Air Products and Chemicals), Polycat™ 5 (pentamethyl diethylene triamine, available from Air Products and Chemicals) and Polycat™ 8 (N,N-dimethyl cyclohexylamine, available from Air Products and Chemicals).

Examples of organotin catalysts are stannic chloride, stannous chloride, stannous octoate, stannous oleate, dimethyltin dilaurate, dibutyltin dilaurate, other organotin compounds of the formula $SnRn(OR)_{4-n}$, wherein R is alkyl or aryl and n is 0-2, and the like. Organotin catalysts are generally used in conjunction with one or more tertiary amine catalysts, if used at all. Commercially available organotin catalysts of interest include Dabco™ T-9 and T-95 catalysts (both stannous octoate compositions available from Air Products and Chemicals).

Catalysts are typically used in small amounts, for example, each catalyst being employed from about 0.0015 to about 5% by weight of the natural oil derived polyol composition. The amount depends on the catalyst or mixture of catalysts, the desired balance of the gelling and blowing reactions for specific equipment, the reactivity of the polyols and isocyanate as well as other factors familiar to those skilled in the art.

A surfactant is often advantageously included in the VE foam formulation to help stabilize the foam as it expands and cures. Examples of surfactants include nonionic surfactants and wetting agents, such as those prepared by the sequential addition of propylene oxide and then ethylene oxide to propylene glycol, solid or liquid organosilicones and polyethylene glycol ethers of long chain alcohols. Ionic surfactants such as tertiary amine or alkylolamine salts of long chain alkyl acid sulfate esters, alkyl sulfonic esters and alkyl arylsulfonic acids can also be used. The surfactants prepared by the sequential addition of propylene oxide and then ethylene oxide to propylene glycol are preferred, as are the solid or liquid organosilicones, which are most preferred. Examples of useful organosilicone surfactants include commercially available polysiloxane/polyether copolymers such as Tegostab (trademark of Goldschmidt Chemical Corp.) B-8462 and B-8404, and DC-198 and DC-5043 surfactants, available from Dow Corning, and Niax™ 627 surfactant from GE Advanced Materials, Silicones. While the amount of surfactant varies with the surface activity of the particular surfactant and its ability to stabilize or open the foam cell structure, and the reactivity, surface tension and viscosity of the mixture of polyols, it is commonly used in amounts between about 0.0015 and 3 pphp based on total weight of polyols.

The foamable composition may contain a chain extender or crosslinker, but their use is generally not preferred, and these materials are typically used in small quantities (such as up to 10 parts, especially up to 2 parts, by weight per 100 parts by weight polyol or polyol mixture) when present at all. A chain extender is a material having exactly two isocyanate-reactive groups/molecule, whereas a crosslinker contains on average greater than two isocyanate-reactive groups/molecule. In either case, the equivalent weight per isocyanate-reactive group can range from about 30 to about 125, but is preferably from 30 to 75. The isocyanate-reactive groups are preferably aliphatic alcohol, primary amine or secondary amine groups, with aliphatic alcohol groups being particularly preferred. Examples of chain extenders and crosslinkers include alkylene glycols such as ethylene glycol, 1,2- or 1,3-propylene glycol, 1,4-butanediol, 1,6-hexanediol, and the like; glycol ethers such as diethylene glycol, triethylene glycol, dipropylene glycol, tripropylene glycol and the like; cyclohexane dimethanol; glycerine; trimethylolpropane; triethanolamine; diethanol amine and the like.

Although it is preferred that no additional blowing agent (other than the water) be included in the foamable polyurethane composition, that is less than an intentional amount or preferably less than about 0.5 pphp, it is within the scope of the invention to include an additional physical or chemical blowing agent. Among the physical blowing agents are $CO_2$ and various hydrocarbons, fluorocarbons, hydrofluorocarbons, chlorocarbons (such as methylene chloride), chlorofluorocarbons and hydrochlorofluorocarbons, ketones such as methyl; ethyl ketone or acetone, and esters such as methyl formate and the like. Chemical blowing agents are materials that decompose or react (other than with isocyanate groups) at elevated temperatures to produce carbon dioxide and/or nitrogen.

Compositions used to produce the viscoelastic foams of the invention optionally include any of the additives commonly known in the art for the production of polyurethane polymers. Any of a range of additives such as surfactants, cell openers, colorants, fillers, load bearing enhancement additives such as copolymer polyols, internal mold releases, antistatic agents, antimicrobial agents, additives for reducing combustibility, dispersants, and other additives known to those skilled in the art are useful within the scope of the invention.

Among suitable additives for use in compositions for forming viscoelastic foams according to the practice of the invention are the additives for improving processability taught in copending U.S. Patent Application 60/836,810 filed Aug. 10, 2006 and its progeny PCT/US07/17419 filed Aug. 3, 2007 entitled "METHOD FOR PREPARING VISCOELASTIC POLYURETHANE FOAM", which are incorporated herein to the fullest extent permitted by law. The additive is at least one compound different from the catalyst or combination thereof an selected from at least one (e1) alkali metal or transition metal salt of a carboxylic acid, (e2) 1,3,5-tris alkyl- or 1, 3-5 tris(N,N-dialkyl amino alkyl)-hexahydro-s-triazine compound; and (e3) carboxylate salts of quaternary ammonium compound. Additives of type (e1) are optionally a salt of a mono- or polycarboxylic acid. It is preferably soluble in water or at least one polyol used in the practice of the invention. The additive of type (e1) is preferably a salt of a $C_{2-24}$ monocarboxylic acid, particularly of a $C_{2-18}$ monocarboxylic acid and especially of a $C_{2-18}$ carboxylic acid and a metal such as lithium, sodium, potassium, cesium, zinc, copper, nickel, silver and the like. Specific examples include sodium acetate, lithium acetate, potassium acetate, sodium hexanoate, potassium octoate, zinc stearate, zinc laurate, zinc octoate, nickel octoate and the like. Alternatively, the type (e1) additive is preferably a salt of a carboxyl-functional organic polymer, for example, an acrylic acid polymer or copolymer. An example of the type (e2) additive is 1,3,5-tris(3-dimethylaminopropyl) hexahydro-s-triazine. A type (e3) additive is optionally a quaternary ammonium salt of a mono- or polycarboxylic acid. It is preferably soluble in water or tat least one polyol used in the practice of the invention. In one embodiment a preferred (e3) additive is a salt of a $C_{1-12}$ monocarboxylic acid, and especially of a $C_{2-12}$ carboxylic acid, for example, trimethyl hydroxyethyl ammonium carboxylate salts. In another embodiment, the preferred type (e3) additive is a quaternary ammonium salt of a carboxyl-functional organic polymer as described with respect to the (e1) additive. Such additives are preferably used in amounts of about 0.01 to 1.0, more preferably 0.01 to 0.5, most preferably 0.025 to 0.25 part per hundred parts by weight polyol or polyol mixture. In some cases higher amounts of the additive are optionally used, such as when an (e1) or (e3) additive is based on a carboxyl-functional organic polymer, in which case, the amount of the additive is optionally preferably as much as 25 parts, more preferably to 10 parts and most preferably to 5 parts by weight per 100 parts by weight polyol or polyol mixture. The additive is dissolved in at least one other component of the reaction mixture, preferably in water, any polyol, the catalyst, a surfactant, a crosslinker or chain extender, or a non-reactive solvent. Solution in the isocyanate is usually least preferred.

In forming the polyurethane from natural oil derived polyol compositions, the natural oil derived polyol composition can be blended with appropriate additives such as foaming agent, drying agent, filler, pigment, catalyst, and the like, or combination thereof to produce the formulated polyol. An amount of isocyanate corresponding to the isocyanate indexes previously discussed is added and stirred with the polyol. The polyol/isocyanate mixture is maintained under vacuum until foaming stops and then poured into mold. A resulting polyurethane foam can be cured either at room temperature or at higher temperature.

In one embodiment the process for forming a viscoelastic foam includes steps of (a) forming a natural oil derived polyol composition comprising at least one natural oil derived polyol and water; (b) admixing at least one gelling catalyst and at least one blowing catalyst with the natural oil derived polyol composition to form a catalyst polyol admixture; (c) supplying an isocyanate in an amount corresponding to an isocyanate index for a pMDI of at least about 65 and at most about 95 or, when the isocyanate is a TDI or MDI or combination thereof, at least about 80 and at most about 105 and (c) admixing the isocyanate with the catalyst polyol admixture. These steps optionally occur simultaneously or in any order. Optionally, additional components such as auxiliary blowing agents are also added. It should be noted that while the process as described includes admixing at least one natural oil derived polyol with other polyols to form the natural oil derived polyol composition, it also includes adding at least one natural oil derived polyol as an additive to the natural oil derived polyol composition.

The VE foam can be prepared in a so-called slabstock process, or by various molding processes. Slabstock processes are of most interest. In a slabstock process, the components are mixed and poured into a trough or other region where the formulation reacts, expands freely in at least one direction, and cures. Slabstock processes are generally operated continuously at commercial scales, but may also be operated in a discontinuous or box foam process.

In a slabstock process, the various components are introduced individually, or in various subcombinations, into a mixing head, where they are mixed and dispensed. Component temperatures are generally in the range of from 15 to 35° C. prior to mixing. The dispensed mixture typically expands and cures without applied heat. In the slabstock process, the reacting mixture expands freely or under minimal restraint (such as may be applied due to the weight of a cover sheet or film). Alternately the components for making viscoelastic foam can be combined simultaneously as in equipment designed for the continuous production of slabstock foam, such as a Maxfoam machine or other methods within the skill in the art such as are described by Hebner, in "Polyurethane Foam: Polymers' Cinderella Product" presented at Insight 95 International Conference, October 1995 available from Foamex International. Such processes can be run using either high pressure injection head technology, optionally utilizing injection of auxiliary blowing agents such as $CO_2$, or also in a low pressure injection system with in-line component mixing. Both technologies are known to those skilled in the art. It is also possible to produce the VE foam in a molding process, by introducing the reaction mixture into a closed mold, where it expands and cures. Other processes can also be used, such as spray foam techniques, where the foaming mixture is sprayed into place against a substrate either by the use of manual spray equipment, or by robotic foam spray equipment, such as the type used to spray sound dampening foam into automobile interiors. In addition, processes such as variable pressure foaming (VPF), in which the foam is produced under decreased pressure in order to make foam with lower hardness at lower density than can be obtained with the same formulation at atmospheric pressure, may be used. Alternatively the VPF process may be performed under increased pressure in order to obtain higher density foam with higher hardness than can be obtained with the same formulation at atmospheric pressure.

The viscoelastic foams of the invention advantageously have properties rarely observed in a viscoelastic polyurethane foam. Where a typical viscoelastic polyurethane foam formed from a polyether polyol has an air flow value of from about 0.1 scfm (0.05 l/s) to about 1.0 scfm (0.47 l/s), foams of the invention are observed to have air flow values greater than foams of the same composition except that at least one polyether polyol of approximately the same functionality, equivalent weight and ratio of primary to secondary hydroxyl functionality is substituted for the natural oil derived polyol (hereinafter referred to as a comparison foam). The foams of the invention formed using a natural oil derived polyol composition has an air flow preferably at least about 100, more preferably at least about 200, most preferably at least about 300 percent greater than that of a comparison foam. The air flow of a viscoelastic foam of the invention is advantageously at least about 0.5, more advantageously at least about 0.6, preferably at least about 0.8, more preferably at least about 1.0, most preferably at least about 1.2 l/s. This improvement in air flow is advantageously obtained without mechanical reticulation used to increase air flow and without use of copolymer polyols. However, one or both are optionally used when the same mechanical reticulation, copolymer polyol or both are also used in a foam used for comparison.

Where a typical viscoelastic polyurethane foam formed from a polyether polyol with an air flow greater than about 0.10 l/s and a density of 4.0 lb/ft$^3$ (64 kg/m$^3$), made with an index of 90 with TDI as the isocyanate, foamed at atmospheric pressure has a hardness value of from about 8.0 lbf (36 N) to about 8.5 lbf (38 N) as measured by 65% Indentation Force Deflection (IFD) as outlined in ASTM D3574 test B$_1$, foams of the invention are observed to have hardness values greater than foams of the same composition except that at least one polyether polyol of approximately the same functionality, equivalent weight and ratio of primary to secondary hydroxyl functionality is substituted for the natural oil derived polyol (hereinafter referred to as a comparison foam). The foams of the invention formed at a density of 3.2 to 3.5 lb/ft$^3$ (51-56 kg/m$^3$), made with an index of 90 with TDI as the isocyanate, foamed at atmospheric pressure using a natural oil derived polyol composition has an air flow preferably at least about 50, more preferably at least about 100, most preferably at least about 200 percent greater than that of a comparison foam. The hardness of a viscoelastic foam of the invention is advantageously at least about 9.0 lbf (40 N), more advantageously at least about 11 lbf (49 N), preferably at least about 15 lbf (67 N), more preferably at least about 18 lbf (80 N), most preferably at least about 20 lbf (89 N); therefore, for the common densities of viscoelastic foam of from about 40 to about 85 kg/m$^3$, practice of the invention preferably yields foams having a hardness indicated by a 65% IFD of advantageously at least about 30N, more advantageously at least about 45N, preferably at least about 60N, more preferably at least about 75N, most preferably at least about 90 N, especially where the foams of higher density have a higher hardness than those of lower density. While there is no general limit to preferred hardness, it is recognized that for specific applications, like pillows, there may be limitations to desirable hardness. Those skilled in the art will also recognize that in the practice of the invention, hardness may be expected to far exceed 90N, especially for foams of high density like 80-85 kg/m$^3$.

Viscoelastic foams of the invention are useful for any of the uses of existing viscoelastic foams, for instance, comfort applications such as mattresses, pillows and cushioning for seating, for sound absorption, for vibration dampening and combinations thereof. Additionally, the foams of the invention are useful in a variety of packaging and cushioning applications, such as mattresses, packaging, bumper pads, sport and medical equipment, helmet liners, pilot seats, earplugs, and various noise and vibration dampening applications.

Objects and advantages of this invention are further illustrated by the figures.

FIG. 1 is a circular graph of properties of a foam of the invention and a comparative foam made not using a natural oil derived polyol composition. In FIG. 1, the properties of a foam corresponding to Example 4 hereinafter is compared with the properties of a foam corresponding to Comparative Sample (CS) B hereinafter. In FIG. 1, the foam of Example 4 is formed at a similar index and has a somewhat lower density and about the same elongation as that of CS B. Otherwise, it shows improvement (increases) in air flow, tensile, tear, resilience, IFD 65% with reduced compression set 90%.

Figure 2:
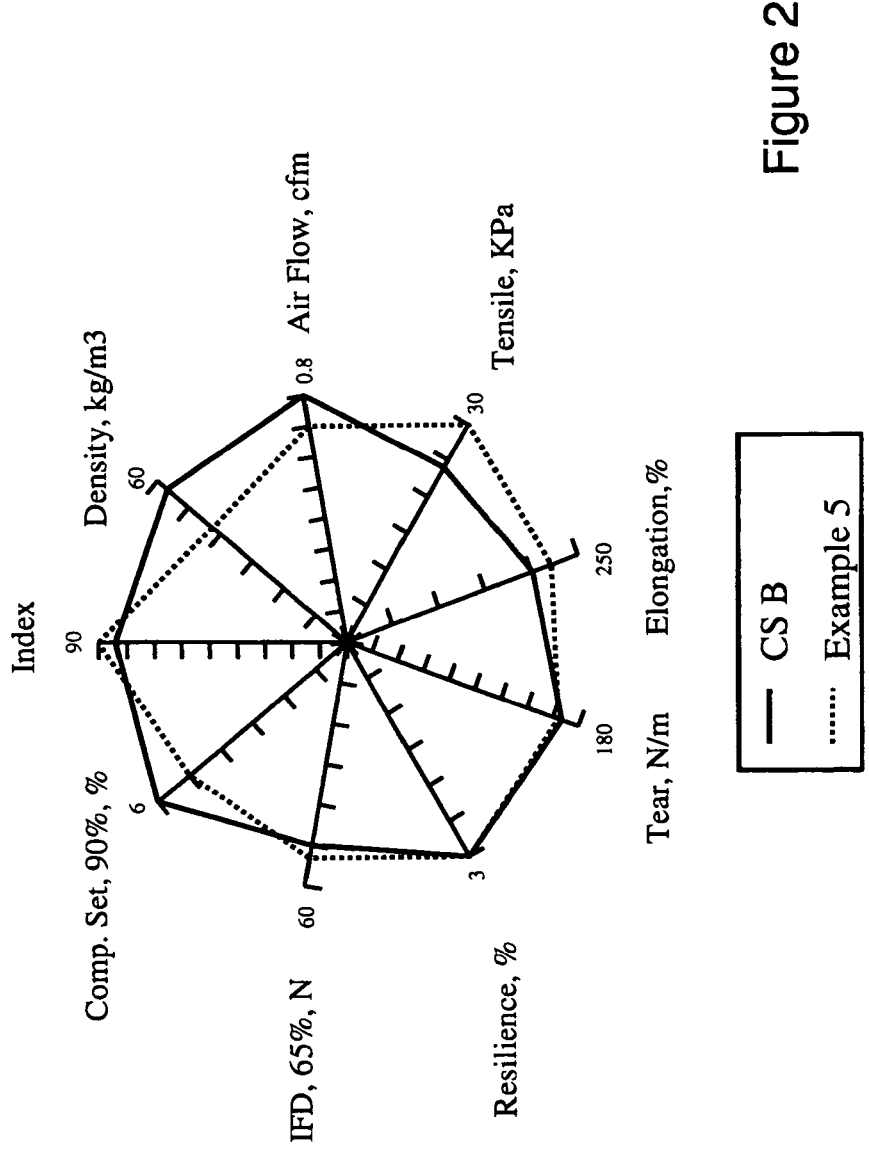
FIG. 2 is a circular graph of properties of a foam of the invention different from the foam in FIG. 1 and a comparative foam made not using a natural oil derived polyol composition.

FIG. 2 is a circular graph of properties of a foam of the invention different from the foam in FIG. 1 and a comparative foam made not using a natural oil derived polyol composition. In FIG. 1, the properties of a foam corresponding to Example 5 hereinafter is compared with the properties of a foam corresponding to CS B hereinafter. The foam of Example 5 has a much lower density than CS B, but is very similar in other properties with a higher tensile and somewhat lower compression set at 90%. This figure shows that a foam of the invention can provide very similar or improved properties as a prior art foam at much lower density (weight), a substantial reduction in materials required. It should be noted that the scales of FIGS. 1 and 2 are different.

Objects and advantages of this invention are further illustrated by the following examples. The particular materials and amounts thereof, as well as other conditions and details, recited in these examples should not be used to limit this invention. Unless stated otherwise all percentages, parts and ratios are by weight. Examples of the invention are numbered while comparative samples, which are not examples of the invention, are designated alphabetically.

EXAMPLES

The following materials are used in making foams of the invention:

PEPO-1 is a 3 functional, 336 equivalent weight 100% percent propylene oxide polyether polyol commercially available from The Dow Chemical Company under the trade designation Voranol 3150 polyol;

PEPO-2 is a 6.9 functional, 1800 equivalent weight random copolymer of propylene oxide and ethylene oxide commercially available from The Dow Chemical Company under the trade designation Voranol 4053 polyol;

PEPO-3 is a 3 functional, 1030 equivalent weight polyether polyol containing 43% by weight of a copolymer of styrene and acrylonitrile commercially available from The Dow Chemical Company under the trade designation Voranol 3943 polyol PEPO-4 is a 3.08 functional polyol with an hydroxyl number of 153-171 mg KOH/g polyol commercially available from The Dow Chemical Company under the trade designation DWK 4066.01 polyol;

NOPO-1 is a 3-functional natural oil polyol prepared from using fatty acids from soy oil and has a primary hydroxyl content of 100% with a hydroxyl number (OH#) of 86 to 92. It is made by reacting hydroxymethylated soybean fatty acid methyl esters with a 624 molecular weight, poly(ethylene oxide) triol at a 4.1:1 molar ratio, using 500 ppm stannous octoate (commercially available from City Chemical Co.) as the catalyst. The resulting polyester has a viscosity of 2000 cP at 25° C. a hydroxyl equivalent weight of 620, Mn of 1860, Mw of 3612, and a polydispersity of 1.54. NOPO-1 has an average of approximately 3.0 hydroxyl groups/molecule. NOPO-1 corresponds to Structure I, wherein X is —O—, and n=3.

Water is deionized water.

MOD-1 is an organosilicone surfactant commercially available from GE Advanced Materials, Silicones under the trade designation Niax L-627.

MOD-2 is an organosilicone surfactant commercially available from GE Advanced Materials, Silicones under the trade designation Niax L-540.

MOD-3 is a water soluble block copolymer commercially available from BYK Chemie under the trade designation DISPERBYK 190™ 190 dispersing agent.

MOD-4 is an organosilicone surfactant commercially available from GE Advanced Materials, Silicones under the trade designation Niax L-625.

MOD-5 is an organosilicone surfactant commercially available from GE Advanced Materials, Silicones under the trade designation Niax L-5614.

MOD-6 is a foam curative product from Aminoquímica under the trade name Amiflex HP.

CAT-1 is bis(dimethylaminoethyl)ether catalyst commercially available from GE Advanced Materials, Silicones under the trade designation Niax™ A1 catalyst.

CAT-2 is an amine catalyst commercially available from GE Advanced Materials, Silicones under the trade designation Niax™ A300.

CAT-3 is a 33 percent solution of diethylenetriamine in 67 percent dipropylene glycol commercially available from Air Products and Chemicals, Inc. under the trade designation Dabco™ 33LV catalyst;

CAT-4 is a stabilized stannous octanoate, gelling catalyst used in flexible slabstock foams, commercially available from available from Air Products and Chemicals, Inc under the trade designation Dabco™ T9 catalyst.

CAT-5 is an amine catalyst commercially available from Air Products and Chemicals, Inc. under the trade designation Dabco™ TL catalyst.

CAT-6 is N,N-dimethyl ethanolamine, an amine catalyst available from Air Products and Chemicals, Inc. as Dabco™ DMEA.

NCO-1 is a 80/20 blend of the 2,4- and 2,6-isomers of toluene diisocyanate used in making flexible foams commercially available from The Dow Chemical Company under the trade designation ISONATE™ TDI-80.

In each example and comparative sample prepared according to "Process A" a foam is prepared by individually metering all of the components and additives (indicated as MOD-1, MOD-2, and MOD-3) of a given formulation except the catalysts, and weighing them into a one quart (0.965 l) capacity metal cup. Component temperatures are approximately 20-30° C. The contents are premixed for 15 seconds at 1800 rpm using a high shear mixer capable of mixing speeds of 3000 rpm, The catalysts which are indicated in the tables are, dispensed by weight, are then added to the stirred components and mixed for an additional 15 seconds at 1800 rpm. An amount designated in the tables of toluene diisocyanate (NCO-1) is then added to the cup and vigorously mixed for 3 seconds at 2400 rpm. The cup contents are then poured into a 15"×15"×10", (45×45×25 cm) wooden box lined with a polyethylene bag. The blow off time and any other distinct reaction characteristics are visually observed and recorded. The resulting foam buns are allowed to cure overnight under a ventilated fume hood. They are then placed in ambient storage for a period of seven days before being submitted for physical property assessment using ASTM test method designation D 3574-03.

In each example and comparative sample prepared according to "Process B" the apparatus used in all experiments is composed of a 50 liter mixing vessel commercially available from Schmuziger, where all the previously weighed components are added, a mechanical agitator driven by a 5 hp (3.73 kW) motor, which agitator is commercially available from WEG under the trade designation 100L0501, and a one cubic meter metallic box commercially available from Schmuziger. The metallic box is pre-treated with a mold-release agent such as the release agent commercially available from ChemTrend under the trade designation CT 6004. The mixing operation is controlled by an automated panel which allows the operator to vary the mixing speed and time of the sequential mixing stages.

The individually weighed polyols and surfactant are placed into the 50 liter mixing vessel and stirred for 30 sec at 1200 rpm. The amounts of water, amine catalysts and other additives as indicated in the tables are added and stirred for 30 sec at 1200 rpm. A tin catalyst (CAT-4) is added and the components are mixed for 30 sec at 1200 rpm. The amount of isocyanate indicated in the tables is added and the final mixing proceeds at 1500 rpm for 5-7 seconds. The foaming mixture is then dispensed into the metallic box where the foam rises in a time period between 90 and 300 seconds. The resulting foam block is demolded and cured for 24 hours at ambient conditions. The foam is then cut into pieces and tested according to the preparation and test procedures outlined in ASTM D-3574-03.

Examples 1-8 and Comparative Samples A and B

Examples 1-8 and Comparative Samples A and B are prepared according to "Process A" using the materials indicated in Table 1.

TABLE 1

Examples 1-8 and Comparative Samples A and B

| | CS A | CS B | EX 1 | EX 2 | EX 3 | EX 4 | EX 5 | EX 6 | EX 7 | EX 8 |
|---|---|---|---|---|---|---|---|---|---|---|
| PEPO-1 | 95 | 95 | 45 | 45 | 45 | 45 | 43 | 45 | 45 | 45 |
| PEPO-2 | 5 | 5 | 5 | 5 | 5 | 5 | 7 | 5 | 5 | 5 |
| NOPO-1 | 0 | 0 | 50 | 50 | 50 | 50 | 50 | 50 | 50 | 50 |
| Water | 1.25 | 1.25 | 1.25 | 1.25 | 1.35 | 1.35 | 1.35 | 1.35 | 1.35 | 1.35 |
| MOD-1 | 1.1 | 1.1 | 1 | 1 | 1 | 1 | 1 | 1 | 1 | 1 |
| MOD-3 | 0 | 0 | 0 | 0.25 | 0.25 | 0.25 | 0.25 | 0.25 | 0.25 | 0.25 |
| CAT-1 | 0.15 | 0.15 | 0.18 | 0.18 | 0.18 | 0.18 | 0.18 | 0.18 | 0.18 | 0.25 |
| CAT-3 | 0.3 | 0.3 | 0.3 | 0.3 | 0.3 | 0.3 | 0.3 | 0.3 | 0.3 | 0.3 |
| CAT-4 | 0.03 | 0.03 | 0.05 | 0.05 | 0.05 | 0.05 | 0.05 | 0.03 | 0.05 | 0.03 |
| NCO-1 (INDEX) | 90 | 92 | 90 | 90 | 90 | 90 | 90 | 90 | 87 | 90 |
| Blow off Times (sec) | 165 | 156 | 150 | 141 | 128 | 141 | 150 | 143 | 132 | 132 |
| Airflow ft$^3$/min | 0.157 | 0.297 | 0.64 | 0.59 | 0.68 | 0.63 | 0.558 | 0.59 | 0.66 | 0.61 |
| Airflow l/min | 4.45 | 8.41 | 18.12 | 16.71 | 19.26 | 17.84 | 15.80 | 16.71 | 18.69 | 17.27 |

TABLE 1-continued

Examples 1-8 and Comparative Samples A and B

|  | CS A | CS B | EX 1 | EX 2 | EX 3 | EX 4 | EX 5 | EX 6 | EX 7 | EX 8 |
|---|---|---|---|---|---|---|---|---|---|---|
| Airflow l/s | 0.07 | 0.14 | 0.30 | 0.28 | 0.32 | 0.30 | 0.26 | 0.28 | 0.31 | 0.29 |
| Density: ASTM lbm/cu_ft | 4.174 | 4.133 | 4.262 | 3.958 | 3.708 | 4.058 | 3.758 | 3.824 | 3.643 | 3.839 |
| Density Kg/m$^3$ | 66.861 | 66.204 | 68.271 | 63.401 | 59.396 | 65.003 | 60.197 | 61.255 | 58.355 | 61.495 |
| Ball Rebound % | 3 | 5 | 14 | 14 | 14 | 15 | 13 | 14 | 13 | 14.2 |
| Tensile Strength psi | 5.9 | 8.3 | 5.9 | 5.8 | 6.3 | 5.8 | 5.7 | 5.9 | 5.9 | 6.1 |
| Tensile Strength kPa | 40.7 | 57.2 | 40.7 | 40.0 | 43.4 | 40.0 | 39.3 | 40.7 | 40.7 | 42.1 |
| Ultimate Elongation % | 110.5 | 131.94 | 101.67 | 114.68 | 121.75 | 106.57 | 115.85 | 107.41 | 116.35 | 116.12 |
| Tear Strength lbf/in | 0.82 | 1 | 0.64 | 0.67 | 0.72 | 0.66 | 0.79 | 0.65 | 0.79 | 0.72 |
| Tear Strength N/m | 143.60 | 175.13 | 112.08 | 117.33 | 126.09 | 115.58 | 138.35 | 113.83 | 138.35 | 126.09 |
| Load @ 25% Deflection lbf | 3.78 | 3.79 | 4.2 | 3.63 | 3.3 | 3.89 | 2.99 | 3.32 | 2.98 | 3.02 |
| Load @ 25% Deflection N | 16.81 | 16.86 | 18.68 | 16.15 | 14.68 | 17.30 | 13.30 | 14.77 | 13.26 | 13.43 |
| Load @ 65% Deflection lbf | 8.35 | 8.25 | 10.26 | 8.6 | 8.1 | 9.65 | 6.67 | 7.62 | 7.18 | 7.23 |
| Load @ 65% Deflection N | 37.14 | 36.70 | 45.64 | 38.26 | 36.03 | 42.93 | 29.67 | 33.90 | 31.94 | 32.16 |
| Load @ 75% Deflection lbf | 15.82 | 15.71 | 19.57 | 16.2 | 15.16 | 18.37 | 12.29 | 14.38 | 13.34 | 13.54 |
| Load @ 75% Deflection N | 70.37 | 69.88 | 87.06 | 72.06 | 67.44 | 81.72 | 54.67 | 63.97 | 59.34 | 60.23 |
| Support Factor % | 2.21 | 2.18 | 2.44 | 2.37 | 2.46 | 2.48 | 2.23 | 2.3 | 2.41 | 2.39 |
| Recovery Time seconds | 5 | 6 | 6 | 6 | 5 | 5 | 6 | 5 | 6 | 5 |
| CS 75%, Parallel-CT % | 2.724 | 2.1023 | 3.2199 | 6.1125 | 8.2097 | 4.5416 | 6.6799 | 6.3462 | 9.2898 | 7.1251 |
| CS 90%, Parallel-CT % | 1.4382 | 2.3404 | 3.8243 | 7.5136 | 10.4229 | 4.2738 | 9.8344 | 9.02941 | 6.2617 | 10.6627 |

Component amounts are in parts per hundred part of total polyol by weight except that isocyanate is listed by equivalent amounts expressed as isocyanate index.
Conversions from English units are below the row containing English units.

The Data in Table 1 illustrates the influence of the replacement of conventional polyether polyol with NOPO-1 with several formulation variations. Across variations of index, water level, and the balance of catalysts, foams containing 50% of NOPO-1 maintain higher air flows than the controls which contain no natural oil derived polyol. In addition, recovery time and foam hardness are maintained while increases in resiliency and comfort factor are observed.

Examples 9-12 and Comparative Sample C

Examples 9-12 and Comparative Sample C are prepared according to "Process B" using the materials indicated in Table 2.

TABLE 2

Comparison of Properties of Foams of the Invention with foam made from polyether polyols.

|  | CS C | EX 9 | EX 10 | EX 11 | EX 12 |
|---|---|---|---|---|---|
| PEPO-4 | 92 | 50 | 50 | 50 | 50 |
| NOPO-1 | — | 50 | 50 | 50 | 50 |
| PEPO-3 | 8 | — | — | — | — |
| WATER | 1.33 | 1.33 | 1.4 | 1.4 | 1.4 |
| MeCl$_2$ | 1.1 | 1.1 | — | — | 3 |
| MOD 2 | 0 | 0 | 0.75 | 0.75 | 0.75 |
| MOD 4 | 1.1 | 1.1 | 0 | 0 | 0 |
| MOD 5 | 1.1 | 1.1 | 0.38 | 0.38 | 0.38 |
| CAT 5 | 0.33 | 0.33 | 0.33 | 0.33 | 0.33 |

TABLE 2-continued

Comparison of Properties of Foams of the Invention with foam made from polyether polyols.

|  | CS C | EX 9 | EX 10 | EX 11 | EX 12 |
|---|---|---|---|---|---|
| CAT 1 | 0 | 0 | 0.10 | 0.10 | 0.10 |
| CAT 6 | 0.42 | 0.42 | 0.25 | 0.2 | 0.2 |
| MOD 6 | 0.60 | 0.60 | 0.60 | 0.60 | 0.60 |
| CAT 4 | 0.25 | 0.25 | 0.20 | 0.20 | 0.20 |
| NCO-1 | 32.2 | 30 | 30.7 | 32.5 | 31.2 |
| Index | 84 | 88 | 88 | 93 | 90 |
| Density, kg/m3 | 56.8 | 56.7 | 55.4 | 51.4 | 42.5 |
| Air Flow, scfm | 0.8 | 0.7 | 1 | 1 | 0.7 |
| Air Flow l/s | 0.376 | 0.329 | 0.47 | 0.47 | 0.329 |
| Tensile Strength, psi | 3.5 | 4.2 | 3.6 | 6.5 | 4.4 |
| Tensile Strength, KPa | 24 | 29 | 25 | 45 | 30 |
| Elongation, % | 201 | 193 | 196 | 200 | 221 |
| Tear Strength, lbf/in | 1.0 | 1.0 | 0.9 | 1.2 | 0.9 |
| Tear Strength, N/m | 167 | 171 | 151 | 209 | 164 |
| Resilience, % | 3 | 5 | 7 | 4 | 3 |
| IFD, 65%, lbf | 11.2 | 16.4 | 16.0 | 20.5 | 11.9 |
| IFD, 65%, N | 50 | 73 | 71 | 91 | 53 |

In Table 2, amounts are in parts per hundred parts by weight of polyol except that isocyanate is listed by equivalent amounts expressed as isocyanate index. All foams are viscoelastic. C.S. C is a viscoelastic foam from art-recognized polyols for the purpose, including a copolymer polyol (PEPO-3) for the purpose of increasing air flow.

Table 2 illustrates the result of replacing 50% of a conventional polyether with the natural oil derived polyol. The index of the foam can be increased, allowing reduction in odor, while maintaining mechanical properties and imparting improvement to air flow. In particular a significant increase in foam hardness, as measured by IFD, is observed at the same time foam density is decreased by 10% (Example 11), or the same foam hardness is observed with a reduction in foam density of 25% (Example 12), or a 50% increase in foam hardness is obtained at an identical density under identical formulation conditions, except with the complete removal of copolymer polyol PEPO-3, and replacement of 50% of the total polyol component with NOPO-1 (Example 9 compared to CS C).

Examples 13-16

Examples 13-16 are prepared according to "Process B" using the materials indicated in Table 3.

TABLE 3

Examples 13-16

|  | EX 13 | EX 14 | EX 15 | EX 16 |
|---|---|---|---|---|
| PEPO-4 | — | — | 50 | 50 |
| PEPO-1 | 45 | 45 | — | — |
| NOPO-1 | 50 | 50 | 50 | 50 |
| PEPO-2 | 5 | 5 | — | — |
| WATER | 1.25 | 1.25 | 1.4 | 1 |
| MOD-2 | — | 0.2 | 0.7 | 0.6 |
| MOD-1 | 1 | 0.8 | 0.3 | 0.3 |
| CAT-2 | 0 | 0 | 0.40 | 0.40 |
| CAT-3 | 0.30 | 0.30 | 0 | 0 |
| CAT-1 | 0.18 | 0.18 | 0.1 | 0.1 |
| CAT-4 | 0.05 | 0.05 | 0.15 | 0.1 |
| NCO-1/Index | 28/90 | 28/90 | 30/90 | 26.7/90 |
| Density, kg/m3 | 59.2 | 59.6 | 49.1 | 62.4 |
| Air Flow, scfm | 2.2 | 1.2 | 0.8 | 0.8 |
| Air Flow l/s | 1.03 | 0.56 | 0.37 | 0.37 |
| Tensile Strength, KPa | 33 | 32 | 37 | 27 |
| Tensile Strength, psi | 4.8 | 4.6 | 5.4 | 3.9 |
| Elongation, % | 149 | 145 | 205 | 166 |
| Tear Strength, N/m | 223 | 223 | 223 | 191 |
| Tear Strength, lbf/in | 1.3 | 1.3 | 1.3 | 1.1 |
| Resilience, % | 18 | 17 | 6 | 7 |
| IFD, 65%, N | 147 | 138 | 94 | 120 |
| IFD, 65%, lbf | 33 | 31 | 21 | 27 |
| Comp. Set, 90%, % | 3.2 | 3.3 | 5 | 3 |

In Table 3, amounts are in parts per hundred part by weight of polyol except that isocyanate is listed by equivalent amounts expressed as isocyanate index. All foams are viscoelastic.

Table 3 illustrates four different formulations for the preparation of viscoelastic foams containing the natural oil derived polyol NOPO-1. Foam densities from 49 kg/m³ (3.1 lb/ft³) to 62 kg/m³ (3.88 lb/ft³) are prepared with air flows from 2.2 scfm to 0.8 scfm (1.04-0.38 l/s).

Examples 17-20

Examples 17-20 are prepared according to "Process B" using the materials indicated in Table 4.

TABLE 4

Examples of Viscoelastic Foams with Greater Than 50 Weight Percent Natural Oil Derived Polyol

| Formulation | EX 17 | EX 18 | EX 19 | EX 20 |
|---|---|---|---|---|
| PEPO-4 | 50 | 40 | 25 | 15 |
| NOPO-1 | 50 | 60 | 60 | 70 |
| PEPO-3 | 0 | 0 | 15 | 15 |
| WATER | 1.40 | 1.40 | 1.40 | 1.40 |
| MOD 2 | 0.60 | 0.60 | 0.60 | 0.60 |
| MOD 1 | 0.20 | 0.20 | 0.20 | 0.20 |
| CAT 2 | 0.40 | 0.40 | 0.40 | 0.40 |
| CAT 1 | 0.10 | 0.10 | 0.10 | 0.10 |
| CAT 4 | 0.15 | 0.15 | 0.15 | 0.15 |
| NCO-1 | 30 | 29 | 26.3 | 25.2 |
| Index | 90 | 90 | 90 | 90 |
| Density, kg/m3 | 49.1 | 48.4 | 48.8 | 49.6 |
| Air Flow, (scfm) | 0.8 | 0.8 | 0.9 | 0.9 |
| Air Flow (l/s) | 0.38 | 0.38 | 0.42 | 0.42 |
| Tensile Strength, psi | 5.4 | 4.2 | 5.1 | 5.4 |
| Tensile Strength, KPa | 37 | 29 | 35 | 37 |
| Elongation, % | 205 | 145 | 156 | 137 |
| Tear Strength, lbf/in | 1.3 | 0.9 | 1.0 | 1.0 |
| Tear Strength, N/m | 223 | 150 | 182 | 172 |
| Resilience, % | 6 | 6 | 9 | 11 |
| IFD, 65%, psi | 21.1 | 24.3 | 28.1 | 26.5 |
| IFD, 65%, N | 94 | 108 | 125 | 118 |
| Comp. Set, 90%, % | 5 | 4 | 5 | 5 |

In Table 4, amounts are in parts per hundred part by weight of polyol except that isocyanate is listed by equivalent amounts expressed as isocyanate index. All foams are viscoelastic.

The Data in Table 4 illustrates the result of increasing the content of NOPO-1 in the formulation from 50% of the polyol by weight, to as much as 70% of the polyol by weight. Significant increase in foam hardness as measured by IFD is observed, while maintaining such desirable properties as air flow, good tensile strength, low compression set, and low resiliency.

Embodiments of the invention include the following:
1. A viscoelastic polyurethane foam which is the reaction product of at least one natural oil derived polyol and at least one aromatic compound having more than one isocyanate group.
2. A viscoelastic polyurethane foam having an air flow of at least about any of 0.5, 0.6. 0.8, 1.0, or 1.2 l/s, wherein the foam is formed in the substantial absence of copolymer polyol and has not been mechanically reticulated, or before being reticulated, preferably wherein at least one natural oil derived polyol is used in making the foam, preferably wherein the foam has a hardness indicated by the 65% IFD of at least about any of 30 N, 45 N, 60 N, 75 N, or 90 N, more preferably at a density of from about 40 to about 85 kg/m$^3$; or at least about any of 40N, 50 N, 67 N, 80 N, or 90 N, more preferably at a density of from at least about 50 kg/m$^3$ to at most about 56 kg/m$^3$, or made at an NCO index of about 90 with TDI, more preferably both.
3. A process of preparing a viscoelastic foam, comprising
    A) forming a reaction mixture including at least one polyol, at least one polyisocyanate, water, at least one catalyst wherein a the polyol comprises at least one natural oil derived polyol
    B) subjecting the reaction mixture to conditions sufficient to result in the reaction mixture to expand and cure to form a viscoelastic polyurethane foam.
4. An article comprising the foam of embodiment 1 or 2, a foam produced by the process of embodiment 3 or a combination thereof.
5. The foam, process or article of any of the preceding embodiments wherein the foam has at least an air flow, and preferably also a hardness as indicated by the IFD, greater than that of a foam formed from the same formulation except that the natural oil derived polyol is replaced by at least one conventional polyether polyol having similar or the same values of equivalent weight, average functionality and ratio of primary hydroxyl groups to total hydroxyl groups, preferably wherein at least one, preferably 2, most preferably 3 of these values of the polyether polyol are within at least about any of 50, 25 or 10 percent of those of the natural oil polyol.
6. The foam, process or article of any of the preceding embodiments wherein at least one natural oil derived polyol is selected from at least one of (a) initiated fatty acid polyester alcohol, (b) castor and soy epoxide product, (c) secondary alcohol alkoxylation product, (d) other alkoxylated natural oil compounds or (e) any selection or combination of (a), (b), (c) and (d).
7. The foam, process or article of any of the preceding embodiments wherein the natural oil derived polyol is a polyester formed by reaction of fatty acid derivatives with at least one of at least one polyol, polyamine, amino alcohol or a combination thereof, preferably selected from at least one of glycerin, sucrose or a combination thereof.
8. The foam, process or article of any of the preceding embodiments wherein the natural oil derived polyol is an alkoxylated natural oil polyol wherein the alkoxylating agent is an alkylene oxide, preferably selected from ethylene oxide, propylene oxide or a combination thereof.
9. The foam, process or article of any of the preceding embodiments wherein at least one natural oil derived polyol having at least 1, preferably 2, more preferably 3 of the following characteristics:
    (a) an average of from at least about any of 2.0, 2.4, 2.7, or 3 to at most about any of 6, 8 or 12 hydroxyl groups per molecule
    (b) an equivalent weight from at least about any of 200, 300, or 500 to at most about any of 1000, 1500 or 2000; or
    (c) a molecular weight of from at least about 400 or 600 to at most about 800 or 1000.
10. The foam, process or article of any of the preceding embodiments wherein at least one conventional polyether polyol different from a natural oil derived polyol is additionally used.
11. The foam, process or article of any of the preceding embodiments wherein at least one conventional polyether polyol is selected from a polyether polyol, a polyester polyol or a combination thereof.
12. The foam, process or article of any of the preceding embodiments wherein the conventional polyol advantageously has at least one of, preferably 2, more preferably 3 of the following:
    (a) a functionality of from about 2.5 to about 6 hydroxyl groups per molecule;
    (b) an equivalent weight of from about 200 to about 1000; or
    (c) a molecular weight of from about any of 600 or 650 to about 3000 or 4500.
13. The foam, process or article of any of the preceding embodiments wherein at least one polyol, preferably the natural oil derived polyol, has primary hydroxyl groups, more preferably at least any of 20, 50, or 100 percent primary hydroxyl groups.
14. The foam, process or article of any of the preceding embodiments wherein at least one first polyol has from about 3 to about 6 functional groups and a molecular weight of from about 3000 to about 4500 and a second polyol has a functionality of from about 2 to about 3 hydroxyl groups and a molecular weight of from about 450 to about 800, and wherein at least one of a first or a second polyol is a natural oil derived polyol.
15. The foam, process or article of any of the preceding embodiments wherein at least one natural oil derived polyol having a functionality of at least about 3 hydroxyl groups and a molecular weight of at least about 1000 is used.
16. The foam, process or article of any of the preceding embodiments wherein the natural oil derived polyol or combination thereof are from about any of 1, 10, 20, 30, or 50 to about any of 70, 75, 80, 90 or 100 weight percent of the total polyols used to make the foam (also referred to as weight of the combined polyol components).
17. The foam, process or article of any of the preceding embodiments wherein the isocyanate is selected from isomers of toluene diisocyanate, diphenylmethanediisocyanate, polydiphenylmethanediisocyanate, or a combination thereof.
18. The foam, process or article of any of the preceding embodiments wherein the isocyanate has an average of at least about 1.8 or 1.9 to about any of 4, 3.5, or 2.5 isocyanate groups per molecule or a combination thereof.
19. The foam, process or article of any of the preceding embodiments wherein the isocyanate is a mixture of about 80 weight percent 2,4 TDI and 20 weight percent 2,6 TDI.
20. The foam, process or article of any of the preceding embodiments wherein water is used to make the foam in an amount of from about any of 0.5, 0.6, 0.8, 1.0 to any of about 1.5, 1.8, 2.0. 2.5 pphp based on weight of the total combined polyol components.

21. The foam, process or article of any of the preceding embodiments wherein the isocyanate or combination thereof is used in an amount corresponding to an isocyanate index from any of 70, 75, 80, or 85 to about any of 90, 96, 100, 105 or 110, preferably from about any of 80, 85, or 90 to about any of 100, 105, or 110 when the isocyanate is selected from isomers of TDI, MDI or a combination thereof, or is preferably from about any of 65, 70, 80, or 85 to about any of 90, 95 or 100 when the isocyanate is PMDI or a combination thereof.

22. The foam, process or article of any of the preceding embodiments wherein the foam is formed in the presence of at least one gelling catalyst and at least one blowing catalyst.

23. The foam, process or article of any of the preceding embodiments wherein the catalysts are selected from amine and tin catalysts, preferably wherein the tin catalyst is stannous octoate, dibutyltin dilaurate or a combination thereof, more preferably in one embodiment dibutyltin dilaurate, more preferably in another embodiment stannous octoate; preferably wherein only one amine catalyst is used.

24. The foam, process or article of any of the preceding embodiments wherein the foam is formed in the presence of at least one surfactant or compatibilizer.

25. The foam, process or article of any of the preceding embodiments wherein either a chain extender or a crosslinker, preferably both, are substantially absent or avoided.

26. The foam, process or article of any of the preceding embodiments wherein water is the only blowing agent used.

27. The foam, process or article of any of the preceding embodiments wherein a blowing agent other than water not used, or is present in an amount less than an intentional amount, preferably less than about 0.5 pphp.

28. The foam, process or article of any of the preceding embodiments wherein water is used with at least one additional blowing agent.

29. The foam, process or article of any of the preceding embodiments wherein the foam advantageously has at least one of, preferably at least 2, more preferably at least 3, most preferably 4 of the following:
   (a) an air flow of at least about any of 0.5, 0.6. 0.8, 1.0, or 1.2 l/s, preferably wherein the foam is formed in the substantial absence of copolymer polyol and has not been mechanically reticulated (or before it is mechanically reticulated);
   (b) an air flow at least about any of 50, 100, or 200 percent greater than that of a foam formed from the same formulation except that the natural oil derived polyol is replaced by at least one conventional polyether polyol having similar or the same values of equivalent weight, average functionality and ratio of primary hydroxyl groups to total hydroxyl groups, preferably wherein at least one, preferably 2, most preferably 3 of these values of the polyether polyol are within at least about any of 50, 25 or 10 percent of those of the natural oil polyol;
   (c) a hardness greater than that of a foam formed from the same formulation except that the natural oil derived polyol is replaced by at least one conventional polyether polyol having similar or the same values of equivalent weight, average functionality and ratio of primary hydroxyl groups to total hydroxyl groups, preferably wherein at least one, preferably 2, most preferably 3 of these values of the polyether polyol are within at least about any of 50, 25 or 10 percent of those of the natural oil polyol; or
   (d) a hardness as indicated by the 65% IFD of at least about any of 30 N, 45 N, 60 N, 75 N, or 90 N, more preferably at a density of from about 40 to about 85 kg/m$^3$; or at least about any of 40N, 50 N, 67 N, 80 N, or 90 N, more preferably at a density of from at least about 50 kg/m$^3$ to at most about 56 kg/m$^3$, or made at an NCO index of about 90 with TDI, more preferably both.

30. The foam, process or article of any of the preceding embodiments wherein a foam is formed by a process comprising steps of (a) forming a natural oil derived polyol composition comprising at least one natural oil derived polyol and water; (b) admixing at least one gelling catalyst and at least one blowing catalyst with the natural oil derived polyol composition to form a catalyst polyol admixture; (c) supplying an isocyanate in an amount corresponding to an isocyanate index for a pMDI of at least about 65 and at most about 95 or, when the isocyanate is a TDI or MDI or combination thereof, at least about 80 and at most about 105 and (c) admixing the isocyanate with the catalyst polyol admixture.

31. The foam, process or article of any of the preceding embodiments wherein the foam is used in comfort applications, mattresses, pillows, seating, sound absorption, vibration dampening, harshness dampening, packaging, bumper pads, sports equipment, medical equipment, safety equipment, helmet liners, pilot seats, earplugs, noise dampening, or a combination thereof.

The invention claimed is:

1. A viscoelastic polyurethane foam comprising the reaction product of a mixture that includes at least one natural oil derived polyol, at least one organosilicone surfactant, water, at least one catalyst, and at least one aromatic compound having an average of more than one isocyanate group,
   the at least one natural oil derived polyol being a hydroxymethyl-containing polyester polyol having an average structure:

$$[H\text{---}X]_{(n-p)}\text{---}R\text{---}[X\text{---}Z]_p$$

wherein:
   R is the residue of an initiator compound having n hydroxyl and/or primary or secondary amine groups; n is at least two; each X is independently —O—, —NH— or —NR'— in which R' is an inertly substituted alkyl, aryl, cycloalkyl, or aralkyl group; p is a number from 1 to n representing the average number of [X—Z] groups per hydroxymethyl-containing polyester polyol molecule; and Z is a linear or branched chain of residues of fatty acids,
   the hydroxymethyl-containing polyester polyol includes an average of at least 1.3 repeating units derived from a hydroxymethyl-group containing fatty acid or ester thereof for each hydroxyl, primary amine, and secondary amine groups in the initiator compound, and has an equivalent weight of from 400 to about 15,000,
   the at least one natural oil derived polyol is at least from about 20 and to about 80 weight percent of the total polyols used to make the foam with the remainder of the polyol being at least one polyether polyol, polyester polyol, or a combination thereof, and
   the viscoelastic foam has a resilience of at most 10 percent measured according to the procedures of ASTM D3574-Test H.

2. The foam of claim 1 wherein at least one natural oil derived polyol is selected from at least one of (a) initiated fatty acid polyester alcohol, (b) castor and soy epoxide product, (c) secondary alcohol alkoxylation product, (d) other alkoxylated natural oil compounds or (e) any selection or combination of (a), (b), (c) and (d).

3. The foam of claim 2 wherein at least one natural oil derived polyol is at least one initiated fatty acid polyester alcohol.

4. The foam of claim 1, wherein the isocyanate is a mixture of about 80 weight percent 2,4 TDI and 20 weight percent 2,6 TDI.

5. A process of preparing a viscoelastic foam, the process comprising:
A) forming a reaction mixture including at least one polyol, at least one organosilicone surfactant, at least one polyisocyanate, water, and at least one catalyst, the at least one polyol including at least one natural oil derived polyol that is a hydroxymethyl-containing polyester polyol having an average structure:

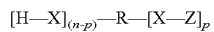

wherein:
R is the residue of an initiator compound having n hydroxyl and/or primary or secondary amine groups; n is at least two; each X is independently —O—, —NH— or —NR'— in which R' is an inertly substituted alkyl, aryl, cycloalkyl, or aralkyl group; p is a number from 1 to n representing the average number of [X—Z] groups per hydroxymethyl-containing polyester polyol molecule; and Z is a linear or branched chain of residues of fatty acids,
the hydroxymethyl-containing polyester polyol includes an average of at least 1.3 repeating units derived from a hydroxymethyl-group containing fatty acid or ester thereof for each hydroxyl, primary amine, and secondary amine groups in the initiator compound, and has an equivalent weight of from 400 to about 15,000, and
the at least one natural oil derived polyol is at least from about 20 and to about 80 weight percent of the total polyols used to make the foam with the remainder of the polyol being at least one polyether polyol, polyester polyol, or a combination thereof; and
B) subjecting the reaction mixture to conditions sufficient to result in the reaction mixture to expand and cure to form a viscoelastic polyurethane foam, that is, a foam having a resilience of at most 10 percent measured according to the procedures of ASTM D3574-Test H.

6. The process of claim 5 wherein water is used to make the foam in an amount of from at least 0.5 to at most 2.5 pphp based on weight of the total combined polyol components.

7. The process of claim 5 wherein the isocyanate or combination thereof is used in an amount corresponding to an isocyanate index from 65 to 105.

8. An article comprising the foam of claim 1 wherein the foam is used in comfort applications, mattresses, pillows, seating, sound absorption, vibration dampening, harshness dampening, packaging, bumper pads, sports equipment, medical equipment, safety equipment, helmet liners, pilot seats, earplugs, noise dampening, or a combination thereof.

9. The foam of claim 1 wherein:
the mixture includes at least one polyether polyol and the at least one natural oil derived polyol accounts for at least 30 weight percent of the total weight of polyols used to make the viscoelastic foam, with a remainder being the at least one polyether polyol,
the at least one organosilicone surfactant accounts for 0.0015 to 3 parts by weight by the total weight of polyols used to make the viscoelastic foam, and
the water accounts for at least 0.5 parts by weight by the total weight of polyols used to make the viscoelastic foam and at most 2.5 parts by weight by the total weight of polyols used to make the viscoelastic foam.

10. The foam of claim 9 wherein the viscoelastic foam has an airflow greater than 0.5 scfm and a density from 40 kg/m$^3$ to 85 kg/m$^3$.

11. The process of claim 5 wherein:
the reaction mixture includes at least one polyether polyol and the at least one natural oil derived polyol accounts for at least 30 weight percent of the total weight of polyols used to make the viscoelastic foam, with a remainder being the at least one polyether polyol,
the at least one organosilicone surfactant accounts for 0.0015 to 3 parts by weight by the total weight of polyols used to make the viscoelastic foam, and
the water accounts for at least 0.5 parts by weight by the total weight of polyols used to make the viscoelastic foam and at most 2.5 parts by weight by the total weight of polyols used to make the viscoelastic foam.

12. The process of claim 11 wherein the viscoelastic foam is formed to have an airflow greater than 0.5 scfm and a density from 40 kg/m$^3$ to 85 kg/m$^3$.

* * * * *